US006053231A

United States Patent [19]

Matsuguchi

[11] Patent Number: 6,053,231

[45] Date of Patent: *Apr. 25, 2000

[54] BONDING APPARATUS FOR CUTTING LABEL CONTINUUM HAVING LABELS FORMED THEREON AND BONDING LABEL TO OBJECT

[75] Inventor: Yutaka Matsuguchi, Osaka, Japan

[73] Assignee: Osaka Sealing Printing Co., Ltd., Osaka-fu, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/618,003

[22] Filed: Mar. 18, 1996

[30] Foreign Application Priority Data

Mar. 23, 1995 [JP] Japan .................................... 7-091412

[51] Int. Cl.[7] ...................................................... B32B 31/00

[52] U.S. Cl. .......................... 156/378; 156/354; 156/360; 156/364; 156/387; 156/519; 156/521; 156/566; 156/64; 156/256; 156/277

[58] Field of Search .................................... 156/521, 354, 156/384, 256, 542, 519, 360, 364, 566, 277, 264, 378, 387, 263, 269, 64; 101/288

[56] References Cited

U.S. PATENT DOCUMENTS

| | | | |
|---|---|---|---|
| 4,561,921 | 12/1985 | Treiber | 156/297 |
| 4,707,211 | 11/1987 | Shibata | 156/354 |
| 5,032,344 | 7/1991 | Kaminski | 264/509 |
| 5,082,439 | 1/1992 | Kaminski | 425/504 |
| 5,112,427 | 5/1992 | Bekker-Madsen | 156/521 |
| 5,205,106 | 4/1993 | Zimmerman et al. | 53/118 |
| 5,284,667 | 2/1994 | Zimmerman et al. | 426/420 |
| 5,425,823 | 6/1995 | Woodside, III | 156/384 |
| 5,437,228 | 8/1995 | Uland | 101/288 |
| 5,540,369 | 7/1996 | Boreali et al. | 225/4 |
| 5,674,345 | 10/1997 | Nash | 156/264 |
| 5,723,190 | 3/1998 | Osaka | 428/40.1 |

*Primary Examiner*—Richard Crispino
*Assistant Examiner*—Linda L. Gray
*Attorney, Agent, or Firm*—Jordan and Hamburg LLP

[57] ABSTRACT

An apparatus for bonding a label of a label continuum to an object where the continuum includes an adhesive layer, a base layer on the adhesive layer, a heat sensitive layer on the base layer, a plurality of spaced label layers on the heat-sensitive layer, and a separation layer on the label layers. The apparatus includes a first feeding means for feeding the continuum, a cutting means for cutting the labels from the continuum within the spaces between the label layers, a printing means for printing on each of the cut labels where the printing means includes a heat-sensitive means for heat sensitizing the heat-sensitive layer labels, a second feeding means for feeding the printed labels, an object feeding means for the objects, a processing means for collecting data on the object and feeding the data to the printing means, and a label bonding means for applying the labels to the objects.

2 Claims, 8 Drawing Sheets

BONDING APPARATUS FOR CUTTING LABEL CONTINUUM HAVING LABELS FORMED THEREON AND BONDING LABEL TO OBJECT

BACKGROUND OF THE INVENTION

1. Field of the Invention

The present invention relates to a bonding apparatus for bonding a label to an object, and more particularly to a bonding apparatus for cutting a separation sheet-unprovided label continuum, namely, a label continuum of so-called non-separable type, having labels successively formed thereon to a plurality of label strips each having a desired length and bonding each label strip to an object.

2. Description of the Prior Art

Most of such conventional label continual have separation sheets formed thereon. Labels having a desired configuration are temporarily attached to a separation agent layer of the separation sheet at predetermined intervals. Label-bonding apparatuses for separating labels from the separation sheet of such a label continuum and bonding them to objects have been developed and manufactured.

In order to prevent resources from being wasted, a separation sheet-unprovided label continuum having a plurality of labels formed thereon successively have been developed.

SUMMARY OF THE INVENTION

It is accordingly a main object of the present invention to provide a bonding apparatus for cutting a separation sheet-unprovided label continuum, namely, a label continuum of so-called non-separable type, having labels successively formed thereon to a plurality of label strips each having a desired length and bonding each label strip to an object.

A bonding apparatus for bonding a label of a label continuum to an object comprises a first feeding means for feeding the label continuum; a cutting means for cutting the label continuum fed by the first feeding means to a plurality of label strips each having a predetermined length; and a second feeding means which has a contact surface having a configuration not easily bonded to an adhesive layer of the label strip formed by cutting the label continuum by the cutting means and feeds the label strip to a bonding position at which the label strip is bonded to the object, by holding the label strip on the contact surface thereof; a feeding means, for feeding the object, formed in proximity to the second feeding means; and a printing means, for performing printing on the label strip fed by the second feeding means, formed in proximity to the bonding position at which bonding of the label strip to the object fed by the feeding means starts.

The printing means for performing printing on the label strip according to information of the object fed by the feeding means is provided immediately before the bonding position at which the label strip is bonded to the object fed by the feeding means.

The feeding means for feeding the object is formed in proximity to the second feeding means; and an information collecting means for collecting the information of the object by detecting and/or measuring the object fed by the feeding means is formed; and the printing means for performing printing on the label strip, based on the information of the object collected by the information collecting means is provided immediately before the bonding position at which the label strip is bonded to the object fed by the feeding means.

The information collecting means is electrically connected with a central processing unit; and the printing means electrically connected with the central processing unit performs printing, based on information outputted thereto from the central processing unit and synchronously with a timing at which the object, the information of which has been collected by the information collecting means is fed to the bonding position.

The label continuum fed by the first feeding means is cut to a plurality of label strips each having a predetermined length by the cutting means. Then, the second feeding means feeds each label strip to the bonding position at which the label strip is bonded to the object. The printing means carries out printing on the label strip synchronously with the movement of the object.

The feeding means for feeding the object is formed in proximity to the second feeding means. The information collecting means for collecting the information of the object by detecting and/or measuring the object fed by the feeding means is formed. The printing means for performing printing on the label strip, based on the information of the object collected by the information collecting means is provided immediately before the bonding position at which the label strip is bonded to the object fed by the feeding means. Accordingly, the printing means carries out printing on the label strip synchronously with the movement of the object.

The information collecting means is electrically connected with a central processing unit. The printing means electrically connected with the central processing unit performs printing, based on the information outputted thereto from the central processing unit and synchronously with a timing at which the object, the information of which has been collected by the information collecting means is fed to the bonding position. Accordingly, The printing means carries out printing on the label strip synchronously with the movement of the object.

According to the present invention, the label continuum fed by the first feeding means is cut to a plurality of label strips each having a predetermined length by the cutting means. The second feeding means feeds each label strip to the bonding position at which the label strip is bonded to the object. Accordingly, a separation sheet-unprovided label continuum, namely, a label continuum of so-called non-separable type is cut to a plurality of label strips having a desired configuration so as to bond each label strip to an object. Because the printing means is provided immediately before the bonding position at which the label strip is bonded to the object, the printing means carries out printing on the label strip synchronously with the movement of the object. Accordingly, there is no possibility that an erroneous object is positioned between the bonding position and an object to which a label strip is to be currently bonded.

The above and further objects, features, aspects, and advantages of the present invention will be more fully apparent from the following detailed description with the accompanying drawings.

DESCRIPTION OF THE PREFERRED EMBODIMENTS

Figure 1:
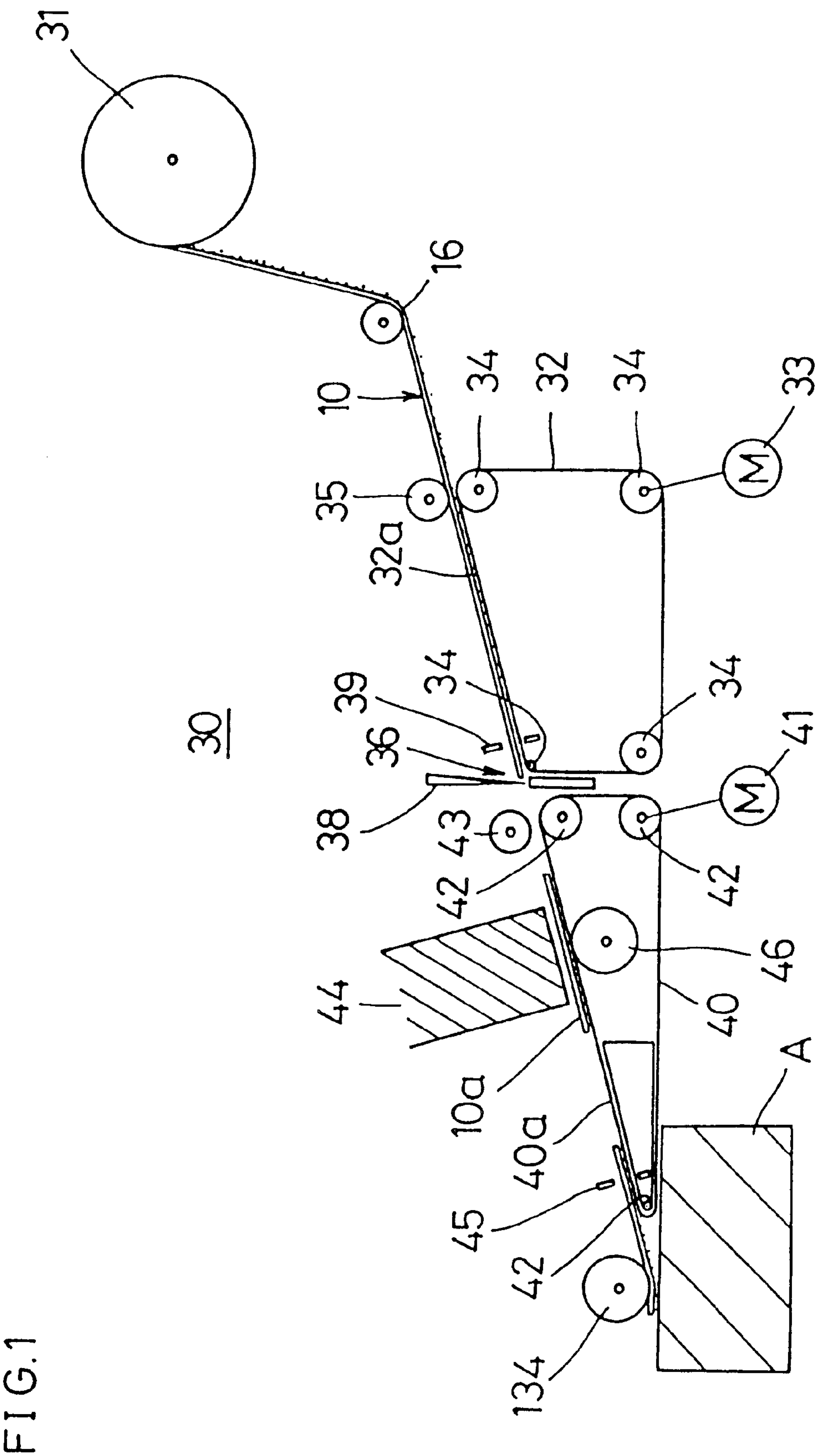
FIG. 1 is an illustration showing a bonding apparatus, according to an embodiment of the present invention, for bonding labels of a label continuum to objects.
Figure 2:
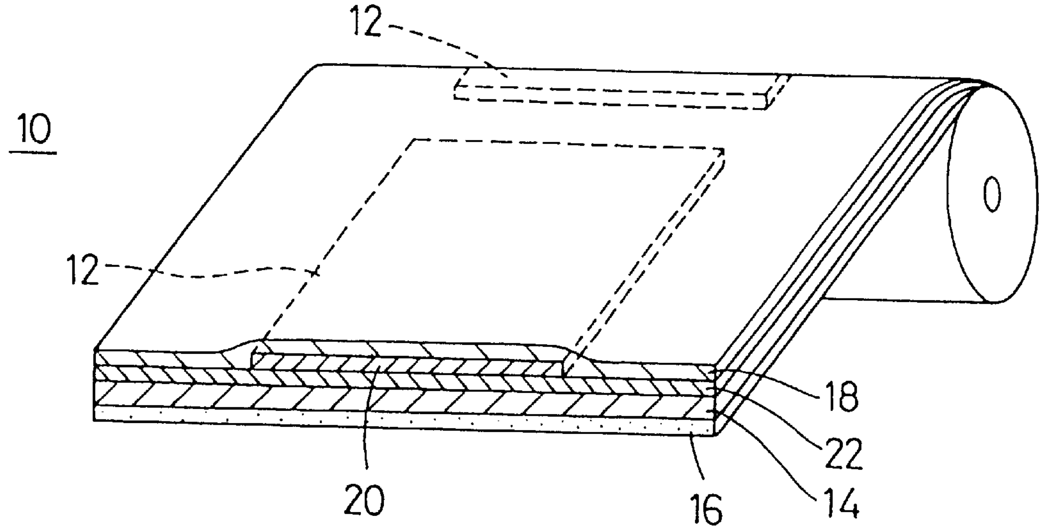
FIG. 2 is a perspective view showing the label continuum to be used in the embodiment shown in FIG. 1.

FIG. 1 is an illustration showing a bonding apparatus, according to an embodiment of the present invention, for bonding labels of a label continuum to objects. FIG. 2 is a sectional view showing the label continuum to be used in the embodiment shown in FIG. 1.

A long and narrow label continuum 10 to be used in the embodiment shown in FIG. 1 comprises a plurality of labels 12 arranged at regular intervals thereon. The label continuum 10 is cut at the boundary between adjacent labels 12 to form a plurality of label strips 10*a*.

The label continuum 10 comprises an adhesive agent layer 16 positioned lowermost; a base layer 14; a heat-sensitive colorable layer 22; a printed layer 20; and a separation agent layer 18 positioned uppermost. The printed layer 20 to be formed as the label 12 is provided at regular intervals on a part of the heat-sensitive colorable layer 22 sandwiched between the base layer 14 and the separation agent layer 18.

As shown in FIG. 2, before the label continuum 10 is cut, the base layer 14 is rolled so that the separation agent layer 18 is temporarily attached to the adhesive agent layer 16.

The label continuum 10 is rolled around a rewinding roll 31 of a bonding apparatus 30 shown in FIG. 1. The label continuum 10 mounted on the rewinding roll 31 is fed to a belt 32 constituting a first feeding means while the label continuum 10 is being rewound from the rewinding roll 31. The belt 32 is endless and mounted on rollers 34 spaced from each other at certain intervals. The belt 32 is fed in a label-feeding direction by the rotational force of a motor 33 connected with one of the rollers 34.

Silicone resin or the like is applied to a contact surface 32*a* of the belt 32 which contacts the adhesive agent layer 16 of the label continuum 10 to form a separation layer on the contact surface 32*a* of the belt 32. The separation layer thus formed prevents the contact surface 32*a* of the belt 32 from being completely bonded to the adhesive agent layer 16 of the label continuum 10. The width of the belt 32 is set to be greater than that of the label continuum 10 so that the label continuum 10 is not curled in its width direction and can be correctly cut downstream. In order to form the separation layer on the contact surface 32*a* of the belt 32, an applying device (not shown) for applying separation agent such as silicone resin to the contact surface 32*a* of the belt 32 is provided at a position proximate to the belt 32 so as to allow the contact surface 32*a* of the belt 32 to have separation property.

A pressing roller 35 comparatively elastic or flexible is provided in opposition to the contact surface 32*a* of the belt 32 so as to bond the label continuum 10 to the contact surface 32*a* in a light degree. To this end, the pressing roller 35 is pressed against the upper surface of the label continuum 10 at a small force.

A cutter 38 serving as a cutting device for cutting the label continuum 10 fed by the belt 32 serving as a first feeding means to a plurality of the label strips 10*a* is provided at a position proximate to a direction-converting portion 36 of the belt 32. The cutter 38 successively cuts the label continuum 10 fed by the rollers 34 and the belt 32 serving as the first feeding means at the boundary between the adjacent labels 12 to form the label strips 1O*a* each having a predetermined length. The cutter 38 is operated based on electric signals outputted from a sensor 39 such as a photo-switch provided in proximity to the direction-converting portion 36 of the belt 32 or the cutter 38.

A belt 40 serving as a second feeding means is provided at a position proximate to the cutter 38. The belt 40 is driven by a motor 41 so that the label strips 10*a* are fed downstream from a position proximate to the cutter 38 to a bonding position, with the label strip 10*a* being spaced at predetermined intervals. To this end, rollers 42 are so arranged that the contact surface 40*a* of the belt 40 slopes down to the bonding position.

The belt 40 is spanned on the rollers 42 in such a manner that the belt 40 forms an acute angle in proximity to the bonding position at which the label strip 10*a* is bonded to the object (A).

As in the case of the first feeding means, a separation layer made of silicon resin or the like is formed on the contact surface 40*a* of the belt 40 so as to feed the label strip 10*a* separated from the label continuum 10 downstream, with the contact surface 40*a* of the belt 40 in contact with the adhesive agent layer 16 of the label strip 10*a* at a small force. A pressing roller 43 comparatively elastic or flexible is provided in opposition to the belt 40 to bond the label strip 10*a* to the contact surface 40*a* of the belt 40 in a light degree. To this end, the pressing roller 43 are pressed against the upper surface of the label strip 10*a* at a small force.

There is provided a thermal head 44 serving as a printing means for heating the heat-sensitive colorable layer 22 of the label strip 10*a* fed by the belt 40. As described previously, the heat-sensitive colorable layer 22 is formed on the upper side of the base layer 14 of the label strip 10*a*, whereas the adhesive agent layer 16 is formed on the lower side of the base layer 14. A platen 46 is provided in proximity to the underside of the belt 40 in such a manner that the platen 46 is opposed to the thermal head 44.

Accordingly, the heat-sensitive colorable layer 22 of the label strip 10*a* fed by the belt 40 is colored by means of the thermal head 44 to form a display portion in the label strip 10*a*, and the label strip 10*a* is bonded to the object (A). The bonding timing is determined by controlling the feeding speed of the belt 40, based on electric signals outputted from a sensor 45 such as a photo-switch.

If adhesive agent of delayed tack type is selected to form the adhesive agent layer 16 of the label continuum 10, it is unnecessary to form the separation layer on the belt 32 serving as the first feeding means. In this case, however, it is necessary to provide the second feeding means with an activating device for heating the adhesive agent of delayed tack type to activate it while the label strip 10*a* is being fed by the belt 40 serving as the second feeding means. In this manner, the adhesive agent is activated to impart adhesion property to the adhesive agent layer 16.

The present invention is not limited to the above-described embodiment, but may be modified to various modes.

Figure 3:
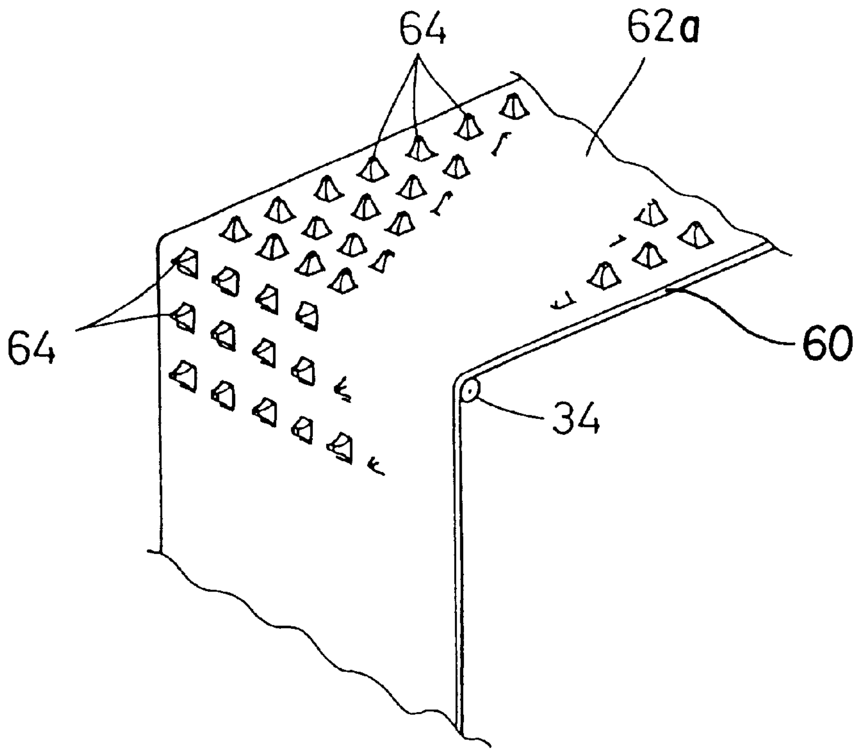
FIG. 3 is an illustration showing main portions of a bonding apparatus, according to a modification of the present invention, for bonding labels of the label continuum to objects.
Figure 4:
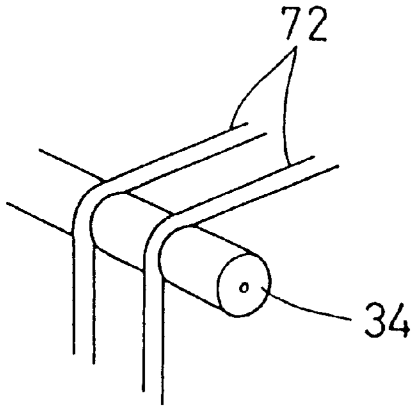
FIG. 4 is an illustration showing main portions of a bonding apparatus, according to another modification of the present invention, for bonding labels of the label continuum to objects.

For example, as shown in FIG. 3, the label continuum 10 may be transported by a belt 60 serving as the first means, with the adhesive agent layer 16 of the label continuum 10 in light contact with a large number of projections 64 formed on a contact surface 60*a* of the belt 62. As another modification of the present invention, as shown in FIG. 4, the label continuum 10 may be fed by a plurality of sectionally circular rubber belts 72 mounted on the rollers 34.

Figure 5:
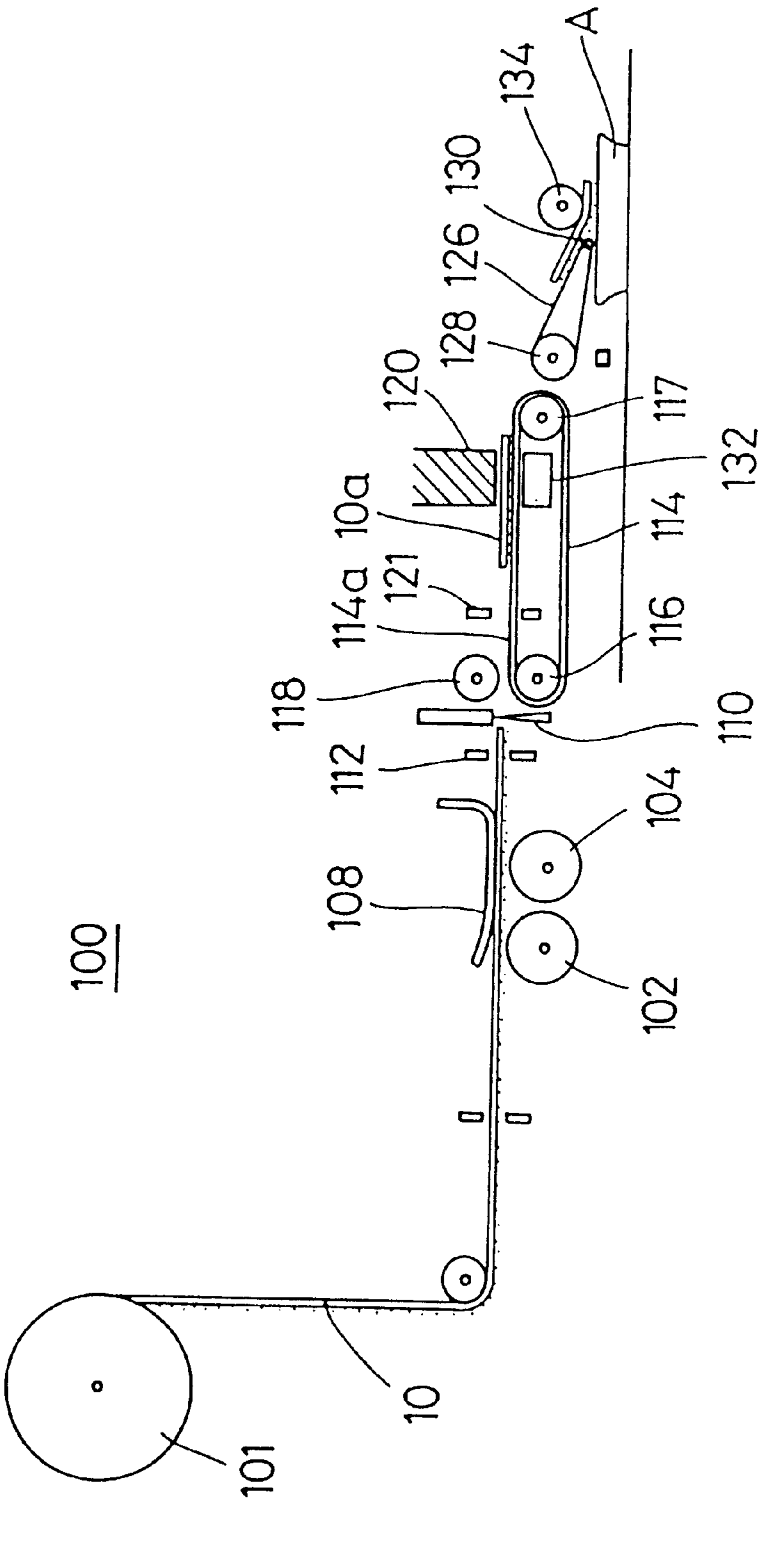
FIG. 5 is an illustration showing a bonding apparatus, according to another embodiment of the present invention, for bonding labels of a label continuum to objects.
Figure 6:
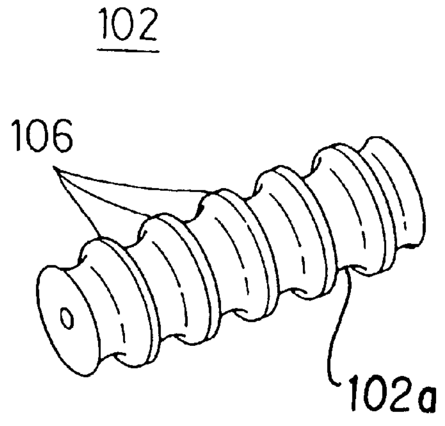
FIG. 6 is an illustration showing main portions of the bonding apparatus, according to the embodiment shown in FIG. 5, for bonding labels of the label continuum to objects.

The present invention may be modified to embodiments as shown in FIGS. 5 and 6.

FIG. 5 is an illustration showing a bonding apparatus, according to another embodiment of the present invention, for bonding labels of a label continuum to objects. FIG. 6 is an illustration showing main portions of the bonding apparatus, according to the embodiment shown in FIG. 5, for bonding labels of the label continuum to objects.

The long and narrow label continuum 10 rolled around a rewinding reel 101 of a bonding apparatus 100 is fed to a pair of rollers 102 and 104 constituting the first feeding means while the label continuum 10 is being rewound therefrom. The rollers 102 and 104 are arranged side by side and spaced at a certain interval, and a plurality of projections 106 to be brought into contact with the adhesive agent layer 16 of the label continuum 10 is formed on the contact surface of the rollers 102 and 104. The rollers 102 and 104 are rotated in a label-feeding direction.

The projections 106 formed on contact surfaces 102*a* of roller 102 and similar non-illustrated projections on roller 104 contact the adhesive agent layer 16 of the label continuum 10 to prevent the rollers 102 and 104 from being completely bonded to the adhesive agent layer 16 of the label continuum 10. The width of the rollers 102 and 104 is set to be greater than that of the label continuum 10 so that the label continuum 10 is not curled in its width direction and can be correctly cut downstream.

A pressing plate 108 comparatively elastic or flexible is provided in opposition to the rollers 102 and 104 so as to bond the label continuum 10 to the contact surface 102*a* and 104*a* of each of the rollers 102 and 104 in a light degree. To this end, the pressing plate 108 is pressed against the upper surface of the label continuum 10 at a small force.

A cutter 110 serving as a cutting device for cutting the label continuum 10 fed by the rollers 102 and 104 serving as the first cutting means to a plurality of the label strips 10*a* is provided at a position proximate to the roller 104. The label continuum 10 fed by the rollers 102 and 104 serving as the first cutting means is successively cut at the boundary between the adjacent labels 12 by the cutter 110 to form the label strips 10*a* each having a predetermined length. The cutter 110 is operated based on electric signals outputted from a sensor 112 such as a photo-switch provided in proximity to the cutter 110.

A belt 114 serving as the second feeding means is provided at a position proximate to the cutter 110. The belt 114 is driven by a motor (not shown) so that the label strips 10*a* are fed downstream from a position proximate to the cutter 110 to the bonding position, with the label strips 10*a* being spaced at predetermined intervals.

The belt 114 is spanned between rollers 116 and 117 spaced from each other at a predetermined interval and driven with the rotation of the roller 116 and/or the roller 117.

As in the case of the first feeding means, a separation layer made of silicone resin or the like is formed on the contact surface 114*a* of the belt 114 so as to feed the label strip 10*a* separated from the label continuum 10 downstream, with the contact surface 114*a* of the belt 114 in contact with the adhesive agent layer 16 of the label strip 10*a* at a small force. A pressing roller 118 comparatively elastic or flexible is provided to bond the label strip 10*a* to the contact surface 114*a* of the belt 114 in a light degree. To this end, the pressing roller 118 is pressed against the upper surface of the label strip 10*a* at a small force.

There is provided a thermal head 120 for heating the heat-sensitive colorable layer 22 of the label strip 10*a* fed by the belt 114. As described previously, the heat-sensitive colorable layer 22 is formed on the upper side of the base layer 14 of the label strip 10*a*, whereas the adhesive agent layer 16 is formed on the lower side of the base layer 14. A platen 132 is provided in proximity to the underside of the belt 114 in such a manner that the platen 132 is opposed to the thermal head 120. The thermal head 120 performs a printing operation, based on electric signals outputted from a sensor 121.

After the heat-sensitive colorable layer 22 of the label strip 10*a* is heat-sensitized, the label strip 10*a* is fed downstream by the belt 114 serving as the second feeding means. The movement speed of the belt is controlled according to a time at which the heat-sensitive colorable layer 22 is heat-sensitized. In order to adjust the difference in the movement speed of the belt 114 and the movement speed of the object (A), a label-bonding device comprising a speed-adjusting mechanism and a belt 126, serving as a label-bonding means, spanned between a roller 128 and a roller 130 is provided downstream the belt 114 such that the label-bonding device is positioned in proximity to the belt 114. Upon receipt of the label strip 10*a*, the label-bonding device feeds the label strip 10*a* to the upper surface of the object (A) to bond the label strip 10*a* thereto. The printing timing of the thermal head 120 is controlled by electric signals generated upon detection of the object (A).

In addition to the label-bonding roller 134 made of sponge shown in FIGS. 1 and 5, a label-bonding means comprising a known robot type, air type, cylinder type or a bonding pad composed of an elastic material such as rubber may be used.

Figure 7:
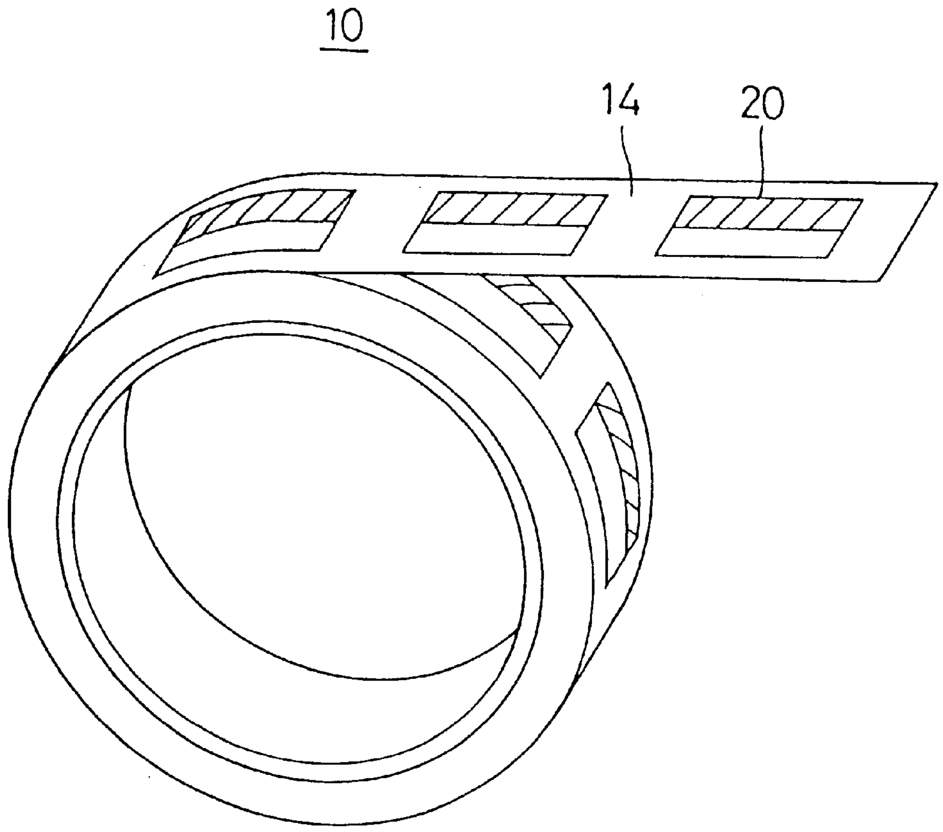
FIG. 7 is a perspective view showing the label continuum to be used in the embodiment shown in FIG. 5.

Referring to FIG. 7, the base layer 14 of the label continuum 10 used in this embodiment is made of a transparent material. This construction allows the transparency of the sensors 112 and 121 composed of a photo-switch to be higher than that of the printed layer 20.

The present invention is not limited to the above-described embodiments, but may be modified to various modes.

Figure 8:
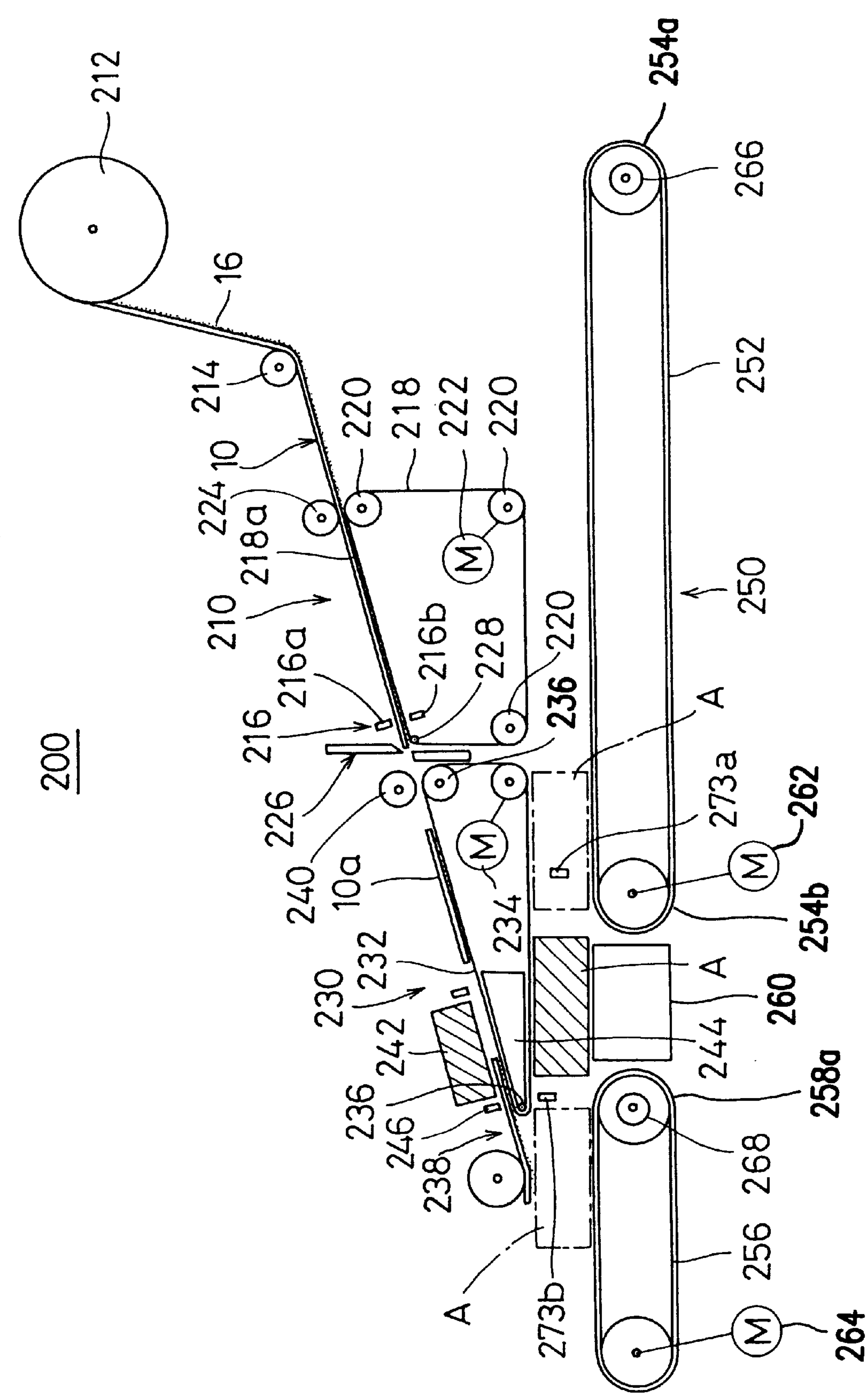
FIG. 8 is an illustration showing a bonding apparatus, according to still another embodiment of the present invention, for bonding labels of the label continuum to objects.
Figure 9:
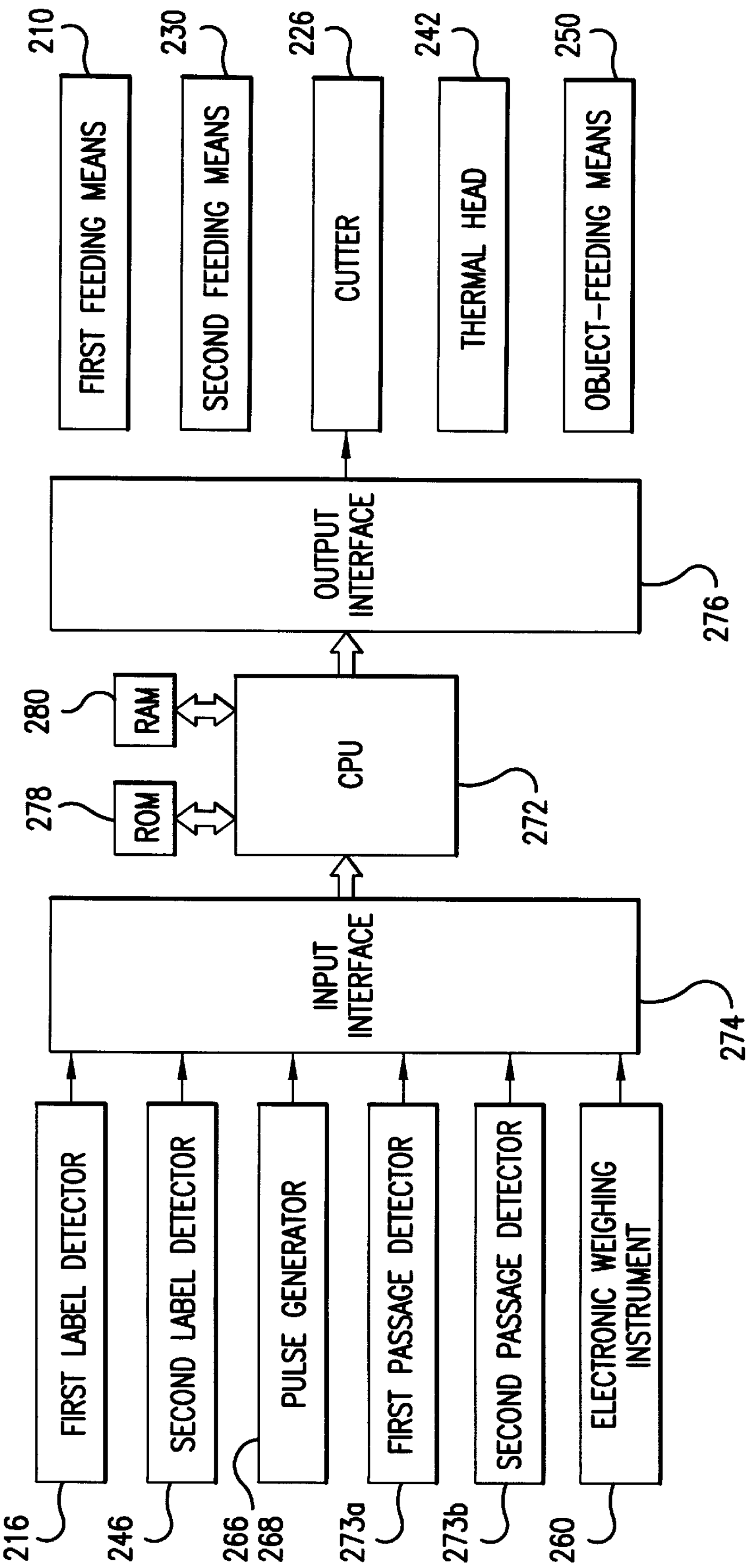
FIG. 9 is a block diagram showing a control circuit of the embodiment shown in FIG. 8.
Figure 10:
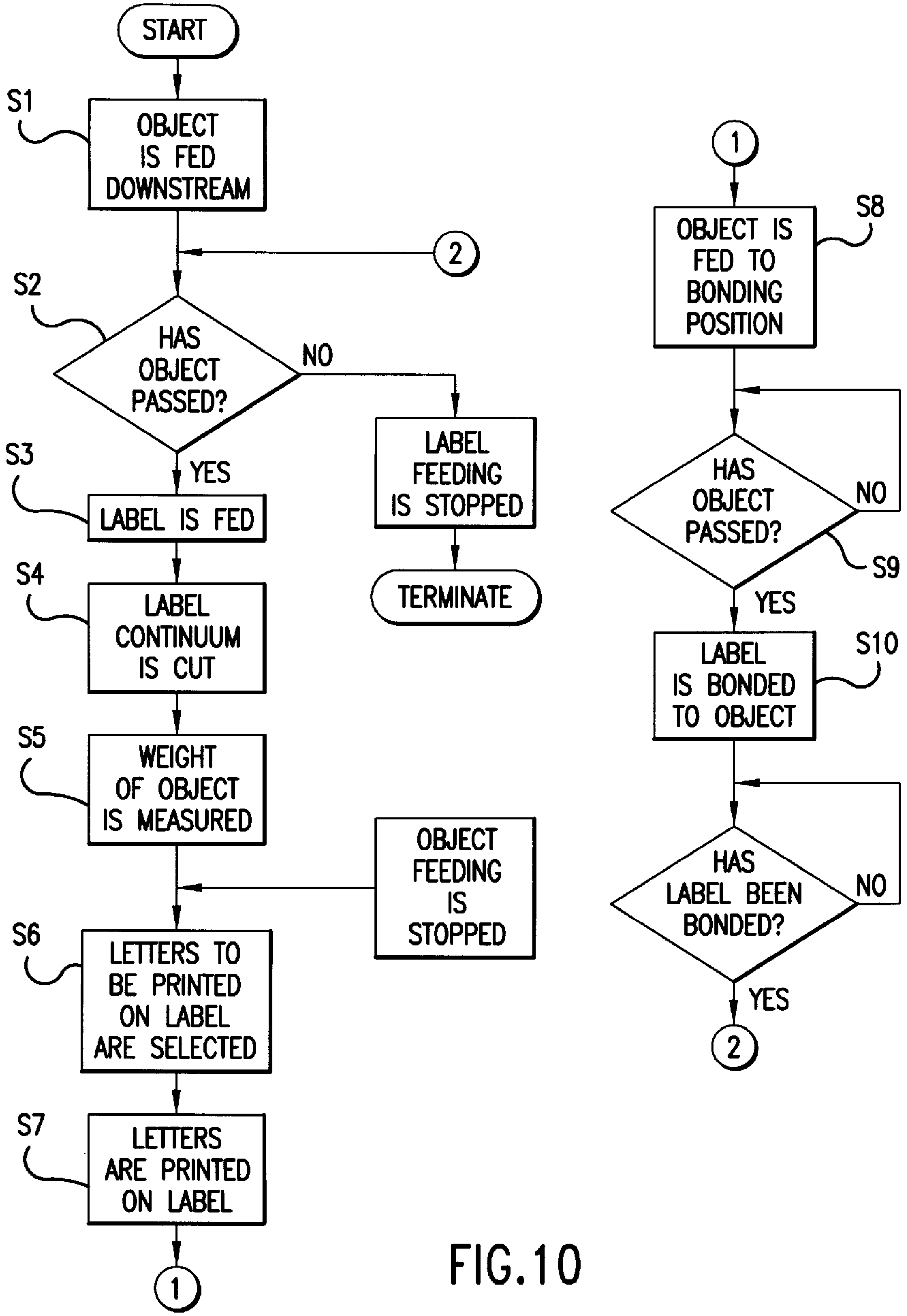
FIG. 10 is a flowchart showing the operation of the embodiment shown in FIG. 8.

FIGS. 8 through 10 show a bonding apparatus, according to another embodiment of the present invention, for cutting a label continuum to label strips each having a predetermined length and bonding each label strip to an object.

A bonding apparatus 200 according to this embodiment includes a first feeding means 210 for feeding the label continuum 10 downstream and supplying a label strip 10*a* to a second feeding means 230.

The first feeding means 210 includes a rewinding reel 212 for holding the rolled label continuum 10 thereon and feeding it out therefrom. Downstream the rewinding reel 212, there are provided a roller 214 and a first label detector 216 for detecting the position of each label 12 of the label continuum 10 which is direction-changed by the roller 214 while the label continuum 10 is being transported. The first label detector 216 includes a projector 216*a* and a light-receiving device 216*b*. The projector 216*a* and the light-receiving device 216*b* positioned symmetrically with respect to the label continuum 10 detects the boundary between a transparent portion of each label 12 and a colored transparent thereof and the boundary between the transparent portion and a semi-transparent portion thereof.

The label continuum 10 wound around the rewinding reel 212 is rewound and fed to a belt 218 constituting the first feeding means 210. The belt 218 is endless and mounted on a plurality of rollers 220 spaced from each other at certain intervals. The belt 218 is fed in a label continuum-feeding direction by the rotational force of a motor 222 connected with one of the rollers 220.

Silicone resin or the like is applied to a contact surface 218*a* of the belt 218 which contacts the adhesive agent layer 16 of the label continuum 10 to form a separation layer on the contact surface 218*a* of the belt 218. The separation layer thus formed prevents the contact surface 218*a* of the belt 218 from being completely bonded to the adhesive agent layer 16 of the label continuum 10. The width of the belt 218 is set to be greater than that of the label continuum 10 so that the label continuum 10 is not curled in its width direction and can be correctly cut downstream. In order to form the separation layer on the contact surface 218*a* of the belt 218, an applying device (not shown) for applying separation agent such as silicone resin to the contact surface 218*a* of the belt 218 is provided at a position proximate to the belt 218 so as to allow the contact surface 218*a* of the belt 218 to have separation property.

A pressing roller 224 comparatively elastic or flexible is provided in opposition to the contact surface 218*a* of the belt 218 so as to bond the label continuum 10 to the contact surface 218*a* in a light degree. To this end, the pressing roller 224 is pressed against the upper surface of the label continuum 10 at a small force.

A cutter 226 serving as a cutting device for cutting the label continuum 10 fed by the belt 218 serving as the first feeding means 210 to a plurality of the label strips 10*a* is provided at a position proximate to a direction-converting portion 228 of the belt 218. The cutter 226 successively cuts the label continuum 10 fed by rollers 220 and the belt 218 serving as the first feeding means 210 at the boundary between the adjacent labels 12 to form the label strips 10*a* each having a predetermined length. The cutter 226 is operated based on electric signals outputted from the first label detector 216 such as a photo-switch provided in proximity to the direction-converting portion 228 of the belt 218 or the cutter 226. A belt 232 serving as the second feeding means 230 is provided at a position proximate to the cutter 226. The belt 232 is driven by a motor 234 so that the label strips 10*a* are fed downstream from a position proximate to the cutter 226 to a bonding position 238, with the label strips 10*a* being spaced at predetermined intervals. To this end, rollers 236 are so arranged that the contact surface of the belt 232 slopes down to the bonding position 238.

The belt 232 is spanned on the rollers 236 in such a manner that the belt 232 forms an acute angle in proximity to the bonding position 238 at which the label 12 is bonded to the object (A).

As in the case of the first feeding means 210, a separation layer made of silicon resin or the like is formed on the contact surface 232*a* of the belt 232 so as to feed the label strip 10*a* separated from the label continuum 10 downstream, with the contact surface 232*a* of the belt 232 in contact with the adhesive agent layer 16 of the label strip 10*a* at a small force. A pressing roller 240 comparatively elastic or flexible is provided in opposition to the belt 232 to bond the label strip 10*a* to the contact surface 232*a* of the belt 232 in a light degree. To this end, the pressing roller 240 is pressed against the upper surface of the label strip 10*a* at a small force.

There is provided a thermal head 242 serving as a printing means for heating the heat-sensitive colorable layer 22 of the label strip 10*a* fed by the belt 232. As described previously, the heat-sensitive colorable layer 22 is formed on the upper side of the base layer 14 of the label strip 10*a*, whereas the adhesive agent layer 16 is formed on the lower side of the base layer 14. A platen 244 is provided in proximity to the underside of the belt 232 in such a manner that the platen 244 is opposed to the thermal head 242. Accordingly, the heat-sensitive colorable layer 22 of the label strip 10*a* fed by the belt 232 is colored by means of the thermal head 242 to form a display portion thereon. Then, a bonding roller serving as a bonding means is pressed against the label strip 10*a* to bond the label strip 10*a* to the object (A). The label-bonding timing is determined by controlling the feeding speed of the belt 232, based on electric signals outputted from a second label detector 246 such as a photo-switch. In this embodiment, the thermal head 242 for performing printing on the label strip 10*a* fed by the second feeding means 230 is provided in the vicinity of the bonding position 238 at which the bonding of the label strip 10*a* to the object (A) fed by an object-feeding means 250 starts.

The object-feeding means 250 for feeding the object (A) to the bonding position 238 and feeding the label-bonded object (A) from the bonding position 238 to a collecting place comprises an upstream feeding means and a downstream feeding means.

That is, a belt 252 serving as the upstream object-feeding means 250 is spanned on rollers 254*a* and 254*b*, thus feeding the object (A) placed thereon downstream.

Similarly, a belt 256 serving as the downstream object-feeding means 250 is spanned on rollers 258*a* and 258*b*, thus feeding the object (A) placed thereon downstream.

An electronic weighing instrument 260 for measuring the weight of the object (A) is provided between the belt 252 serving as the upstream object-feeding means 250 and the belt 256 serving as the downstream object-feeding feeding means 250.

The electronic weighing instrument 260 is connected with a CPU 272 of a control device 270. The CPU 272 arithmetically processes the data of the weight or the like of the object (A) measured by the electronic weighing instrument 260. Thereafter, based on the data outputted from the electronic weighing instrument 260 to the CPU 272, the thermal head 242 prints the weight of the object (A) and a price calculated based on the weight of the object (A) on the upper surface of the label strip 10*a*.

In this embodiment, the thermal head 242 is positioned immediately before the bonding position 238 so that printing is carried out immediately before the label strip 10*a* is bonded to the object (A). Thus, the printing timing is synchronized with the movement of the object (A) and thus, there is no possibility that an object is erroneously positioned between the weight-measured object (A), the weight of which has been measured by the electronic weighing instrument 260 and the bonding position 238. That is, the label strip 10*a* on which the weight and the price have been printed synchronously with the movement of the weight-measured object (A) is fed to the bonding position 238 so as to bond the label strip 10*a* thereto.

The upstream object-feeding means 250 includes the feeding belt 252; a feeding motor 262; a pulse generator 266, connected with a roller 254*a*, for generating pulses according to the rotation of the roller 254*a*. Similarly, the downstream object-feeding means 250 includes the feeding belt 256; a feeding motor 264; a pulse generator 268, connected with a roller 258*a*, for generating pulses according to the rotation of the roller 258*a*.

A first passage detecting means 273*a* and a second passage detecting means 273*b* provided alongside each of the belt 252 and the belt 256 output signals to the CPU 272 when they have detected that the object (A) has passed them.

The object-feeding means 250 is connected with the control device 270 for controlling the operation thereof.

The control device 270 includes an input interface 274, the CPU 272, an output interface 276, a ROM 278 and a RAM 280 both storing an operation program.

As shown in FIG. 9, through the input interface 274, the CPU 272 receives signals from the first label detector 216, the second label detector 246, the pulse generator 266, the pulse generator 268, the first passage detecting means 273*a*, the second passage detecting means 273*b*. The CPU 272 is also connected with the ROM 278 and the RAM 280.

Through the output interface 276, an output signal of the CPU 272 is transmitted to the first feeding means 210 serving as the label-feeding means, the second feeding means 230 also serving as the label-feeding means, the cutter 226, and the thermal head 242 serving as the printing device.

The operation of the bonding apparatus is described below with reference to a flowchart shown in FIG. 10. At step S1, an operator places the object (A) on the belt 252 and then the feeding of the object (A) is started. The feeding of the object (A) is continued at a constant speed until label-bonding operation is completed.

At step S2, the CPU 272 determines whether or not the object (A) has passed the first passage detecting means 273*a*.

At step S3, the CPU 272 outputs a control signal for starting the feeding of the label continuum 10 to the first feeding means 210. Based on the control signal, the object (A) is fed downstream by the first feeding means 210.

At step S4, based on electric signals outputted from the first label detector 216, the CPU 272 outputs a control signal for starting an operation of cutting the label continuum 10 to the cutter 226. Upon receipt of the control signal, the cutter 226 is actuated, thus cutting the label continuum 10 being fed by the first feeding means 210 to the label strips 10*a* each having the predetermined length and the predetermined width.

At step S5, the CPU 272 outputs a control signal so as to measure the weight of the object (A) by the electronic weighing instrument 260.

At steps S6 and S7, based on the control signal outputted from the CPU 272, the electronic weighing instrument 260 measures the weight of the object (A) and then, the data of the weight-measured object (A) is fed back.

Then, the thermal head 242 performs printing on the label strip 10*a*, based on the data of the weight-measured object (A).

At steps S8 and S9, synchronously with the printing performed on the label strip 10*a*, the object (A) is fed to the bonding position 238 by the downstream object-feeding means 250, and the label strip 10*a* is fed to the bonding position 238 by the second feeding means 230, synchronously with the feeding operation of the downstream object-feeding means 250 and based on electric signals outputted from the second passage detecting means 273*b* which has detected that the object (A) has passed it.

The CPU 272 determines whether or not the label strip 10*a* to be bonded to the object (A) has been detected by the second passage detecting means 273*b*. If YES at step S9, the program goes to step S10. At step S10, the CPU 272 outputs a control signal for controlling the feeding of the label strip 10*a* to the second feeding means 230, and further, the CPU 272 outputs a control signal for controlling the feeding of the object (A) to the downstream object-feeding means 250 so as to bond the front end of the label strip 10*a* fed to the bonding position 238 to the upper surface of the object (A). As the object (A) moves downstream, the entire surface of the label strip 10*a* is bonded to the upper surface of the object (A).

While the present invention has been particularly described and shown, it is to be understood that such description is used merely as an illustration and example rather than limitation, and the spirit and scope of the present invention are determined solely by the terms of the appended claims.

What is claimed is:

1. Apparatus for bonding a label of a label continuum to an object comprising:

a label continuum having a base layer and a heat sensitive layer, said label continuum having a plurality of spaced label layers on said heat-sensitive layer such that interval spaces are provided between successive label layers, said label continuum further including a separation layer disposed on said label layers and said heat sensitive layer such that the label layers and heat-sensitive layer are sandwiched between the base layer and the separation layer, said label continuum having an outer adhesive layer on said base layer;

a first feeding means including a first feeding belt for feeding the label continuum along a first feeding path as said outer adhesive layer lightly bonds to said first feeding belt;

a cutting means downstream of said first feeding belt for cutting the label continuum fed by the first feeding means into a plurality of label strips such that said label strips have cut ends, each label strip including a separate label layer and interval spaces of label continuum between each label layer and its respective cut ends, each interval spaces of label continuum including a portion of said base layer, a portion of said adhesive layer, a portion of said heat-sensitive layer and a portion of said separation layer;

a second feeding means juxtaposed to and downstream of said cutting means, said second feeding means including a second belt for receiving said label strips and for feeding said label strips along a second generally linear feeding path as said outer adhesive layer lightly bonds to the second feeding belt, said label continuum and said label strips traversing a third generally linear path when passing from said first feeding means to said second feeding means, said first, second, and third linear paths being generally linearly aligned, said cutting means cutting said label continuum as said label continuum traverses along said third generally linear path;

printing means juxtaposed to one of said feeding means for effecting printing of each label layers on each of said label strips, said printing means including heat-sensitive means for heat sensitizing the heat-sensitive layer in each of said spaced label strips on the feeding belt of said one feeding means;

object feeding means for feeding objects along a generally linear object feeding path;

processing means for collecting data on the object on said feeding means and feeding said data to said printing means such that the printing means effects printing on each label layer on each label strip based on the data received from said processing means; and label bonding means downstream of said second feeding means operable to bond a label strip each including a separate printed label layer onto a moving object on said object feeding means as said label strip moves onto said object moving on said object feed means.

2. Apparatus for bonding a label of a label continuum to an object comprising:

a label continuum having a base layer and a heat-sensitive layer, said label continuum having a plurality of spaced label layers on said heat-sensitive layer such that interval spaces are provided between successive label layers, said label continuum further including a separation layer disposed on said label layers and said heat-sensitive layer such that the label layers and heat-sensitive layer are sandwiched between the base layer and the separation layer, said label continuum having an outer adhesive layer on said base layer;

a first feeding means including a first feeding belt for feeding the label continuum along a first feeding path as said outer adhesive layer lightly bonds to said first feeding belt;

a cutting means downstream of said first feeding means for cutting the label continuum fed by the first feeding means into a plurality of label strips such that said label strips have cut ends, each label strip including a separate label layer and interval spaces of label continuum between each label layer and its respective cut ends, each interval space of label continuum including a portion of said base layer, a portion of said adhesive layer, a portion of said heat-sensitive layer and a portion of said separation layer;

a second feeding means including a second feeding belt downstream of said cutting means for receiving said label strips and for feeding said label strips along a second generally linear feeding path as said outer adhesive layer lightly bonds to the second feeding belt;

printing means juxtaposed to one of said feeding means for effecting printing of each label layer on each of said label strips, said printing means including heat-sensitizing means for heat sensitizing the heat-sensitive layer in each of said spaced label strips on the feeding belt of said one feeding means;

object feeding means for feeding objects along a generally linear object feeding path;

processing means for collecting data on the object on said object feeding means and feeding said data to said printing means such that the printing means effects printing on each label layer on each label strip based on the data received from said processing means;

a label bonding means downstream of said second feeding means for receiving said label strips from said second feeding means and for moving said label strips along a third generally linear path to a position overlying an object moving on said object moving path, said label bonding means being operable to deposit and bond said label strips each including a separate printed label layer onto said objects as said objects move along said object feeding path.

* * * * *